United States Patent [19]
Johnson

[15] 3,687,137
[45] Aug. 29, 1972

[54] SMALL ANIMAL ANESTHESIA MACHINE
[72] Inventor: Donald W. Johnson, c/o Snyder Manufacturing Co., Inc. 1458 5th St. N.W., New Philadelphia, Ohio 44663
[73] Assignee: Snyder Manufacturing Company, Inc., New Philadelphia, Ohio
[22] Filed: Nov. 13, 1969
[21] Appl. No.: 876,335

[52] U.S. Cl. ............................................... 128/188
[51] Int. Cl. ............................................ A61n 17/00
[58] Field of Search ......... 128/188, 186, 194, 145.6, 191 A

[56] References Cited
UNITED STATES PATENTS

| 2,586,677 | 2/1952 | Marrett | 128/188 |
| 3,017,881 | 1/1962 | Smith | 128/188 |
| 2,839,055 | 6/1958 | Marrett | 128/188 |

FOREIGN PATENTS OR APPLICATIONS

| 1,106,035 | 5/1961 | Germany | 128/188 |
| 1,193,522 | 3/1970 | Great Britain | 128/188 |

Primary Examiner—Richard A. Gaudet
Assistant Examiner—G. F. Dunne
Attorney—Olson, Trexler, Wolters & Bushnell

[57] ABSTRACT

Anesthetizing apparatus capable of use with anesthetic agents requiring an in-line arrangement, as well as those necessitating the use of an out-of-line arrangement. The apparatus includes the main body member having a plurality of internal passages which provide a closed system or circuit, and further defining two separate and distinct paths within said circuit. Waste gas purging means, vaporizer means and oxygen inlet means are connected to the body member in communication with said internal passages. The apparatus further includes control means for selectively providing one or the other of said paths for the carbon dioxide free waste gas leaving the purging means. Accordingly, purged waste gas to be re-circulated to the animal can be either mixed with oxygen and then subjected to the vaporizer (in-line arrangement), or said gas may bypass the vaporizer and be mixed with oxygen that has previously been subjected to the vaporizing process (out-of-line arrangement). In addition there is provided a novel construction for the main body member, wherein a pair of opposed plate members are utilized, one said member having channels formed therein such that upon assembly said channels are covered to define the internal passages of the system

16 Claims, 11 Drawing Figures

SMALL ANIMAL ANESTHESIA MACHINE

BACKGROUND OF THE INVENTION

The present invention relates to anesthetic apparatus for small animals or the like. More particularly, this invention provides apparatus of the aforementioned general type which can be employed with those anesthetic agents requiring an "in-line" arrangement, as well as those requiring an "out-of-line" system, as will be explained more completely hereinafter.

Anesthetizing apparatus of the type under discussion normally employ the use of a closed system or circuit. That is, the exhaust gases exhaled by the animal are circulated through a purging agent to remove the carbon dioxide, such that the purged gas, except for its oxygen deficiency is fit for rebreathing. Accordingly, since all of the anesthetic gas is not absorbed by the animal upon each instance of inhaling, this regeneration process permits unabsorbed anesthetic gas that is exhaled to be reused, thus markedly reducing the amount of anesthetic agent that is needed. This factor is especially important in the case of certain recently developed anesthetics, such as halothane which are expensive and must be conserved, if economical operation is to be realized.

Of course, before the purged waste gas is recirculated to the animal, it is necessary that oxygen be added thereto, in order to sustain the animal. Further, since the animal will also absorb quantities of the anesthetic gas, it is necessary to employ vaporizing apparatus, which permits the introduction of anesthetic gas into the system under controlled conditions. However, once a desired state of anesthetization is reached, the addition of anesthetic gas can be terminated with the unabsorbed gas maintaining the desired condition for a short period of time.

While numerous anesthetics can be employed in the anesthetizing of small animals, these can be broken down into two general groupings; those requiring an "in-line" system, and those requiring an "out-of-line" arrangement. With an "in-line" setup, the vaporizer apparatus for the anesthetic agent is positioned in the inhalation portion of the system. That is, after the carbon dioxide has been removed from the exhaust gas by the purging agent, and the required amount of oxygen introduced into the system, the resulting gaseous combination, or a portion thereof, is exposed to the vaporizing process to add anesthetic gas thereto prior to rebreathing by the animal. On the other hand, with an "out-of-line" arrangement, only the newly introduced oxygen is subjected to the vaporizing operation with the resulting mixture of oxygen and anesthetic gas then being combined with the purged waste gases. That is, the exhaled, purged waste gases which contain a quantity of anesthetic gas, are not resubmitted to the vaporizing process.

Two examples of the aforementioned types of anesthetic agents used to anesthetize both large and small animals are methoxyflurane and halothane. Methoxyflurane is illustrative of the agents which require the use of an "in-line" arrangement, while halothane represents those requiring an "out-of-line" system.

Both of the above-mentioned anesthetizing agents have certain desirable characteristics such that a veterinarian may use both during his day-to-day practice, depending upon his preference, or the choice dictated in relation to the type of animal encountered and the condition thereof. Halothane permits rapid induction, free from excitement, since it is non-irritating to the mucous membranes and the eyes, and does not possess an offensive odor, factors which often excite an animal and cause him to struggle. In addition, halothane is non-explosive and non-flammable. Also, it will vaporize quickly, and due to its potency, a deep anesthesia can be induced quite rapidly and easily. Methoxyflurane, on the other hand, is somewhat less expensive than halothane, and has been in use for a considerably longer period so veterinarians are more skilled in its use and control. Accordingly, while methoxyflurane does not possess many of the advantages of halothane, it is preferred by some veterinarians. Thus, it can be appreciated that the high cost of anesthetizing equipment, and the necessity of utilizing agents requiring different types of arrangements, make it extremely advantageous for a veterinarian to have one machine capable of handling both types of anesthetizing agents.

DESCRIPTION OF THE ILLUSTRATED EMBODIMENTS

FIG. 1 is a partial perspective view illustrating an embodiment of the present invention being employed to anesthetize a dog or the like;

DESCRIPTION OF THE ILLUSTRATED EMBODIMENT

Figure 1:
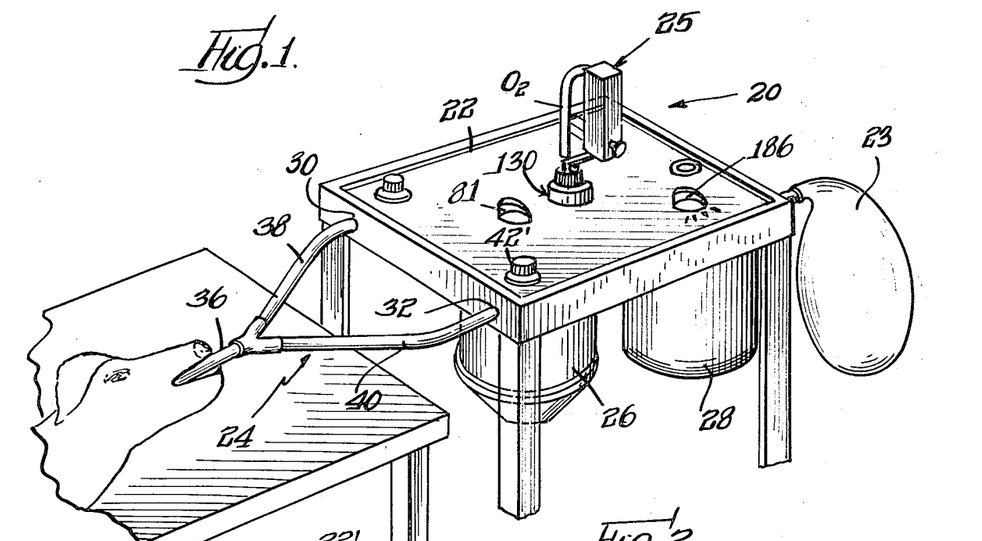

Referring now to the drawings in more detail, FIG. 1 shows a preferred form of the anesthetizing apparatus for the present invention being used on a dog, said apparatus being designated generally 20. Apparatus 20 includes primarily a main body member 22, a Y-branched tubular arrangement 24, a container 26 for the purging agent, oxygen inlet means 25, and a vaporizer unit 28.

The body member 22 has an inlet port 30 and an outlet port 32 between which there are provided a series or system of internal passageways that define, with the container 26 and the vaporizer unit 28 a pair of closed circuit paths for the overall system. The oxygen supply means 25, which will be discussed more completely hereinafter, is also connected with the internal passages of the body member 22 so that a metered supply of oxygen may be continuously introduced into the system.

Quite briefly then, the tubular arrangement 24 provides means whereby exhaled waste gases are introduced into the body member 22 by means of the inlet port 30. These gases then pass to the purging agent container 26 where the carbon dioxide is removed. Next, the purged gas, which contains an insufficient amount of oxygen to sustain the animal, is mixed with newly added oxygen supplied to the system by the inlet means 25. Also, subsequent to purging, but prior to inhalation or rebreathing, additional amounts of anesthetic gas are introduced into the system by the vaporizer unit 28, as required.

Should the animal stop breathing during the period it is anesthetized, a bag element 23 as shown in FIG. 1 may be employed to induce artificial respiration. The bag 23 is connected to port in the body member 22, which in turn communicates with the internal passages. Thus, the interior of bag 23 is in communication with the remainder of the system, such that by the squeezing thereof, the internal pressure of the gas may be raised to expand the animal's lungs and induce breathing.

More specifically, considering the apparatus 20 in detail, the tubing arrangement 24 includes an endotracheal portion 36, disposed within the trachea of the animal, an exhalation branch 38 connected to inlet port 30, and a corresponding inhalation branch 40 connected to the outlet port 32 of the body member 22. A valving arrangement is associated with either the Y-branch portion of the assembly 24, or with the ports 30 and 32, such that gas can travel in only one direction in the branches 38 and 40. In this regard, the illustrated embodiment employs one-way valve assemblies 42 and 42' in conjunction with said ports 30 and 32 as will be discussed hereinafter.

Accordingly, the exhaled waste gases will travel from the endotracheal tube 36 into the exhalation portion 38, and from there to the interior body member 22 via the inlet port 30. Next, the waste gas is subjected to the purging agent, i.e., soda lime, carried by the container 26 in order to remove the carbon dioxide therefrom and the requisite amounts of oxygen and anesthetic gas are added thereto. The resulting gaseous mixture, which is now reconstituted and fit for breathing, is then introduced into the inhalation branch 40 of the tube arrangement 24 by means of the outlet port 32.

Regarding the introduction of the anesthetic agent to the gas in the system, it should be recalled that in an out-of-line arrangement, the oxygen being introduced, or a portion thereof, is subjected to the vaporizer unit 28 prior to being mixed with the purged waste gas. On the other hand, with an in-line system, the purged waste gas is mixed with the requisite amount of oxygen, and the resultant gaseous combination is then subjected to the vaporizing process in order to add the anesthetic agent to the overall mixture. Thus, with this alternate mode of operation in mind, attention is now invited to FIG. 2.

Figure 2:
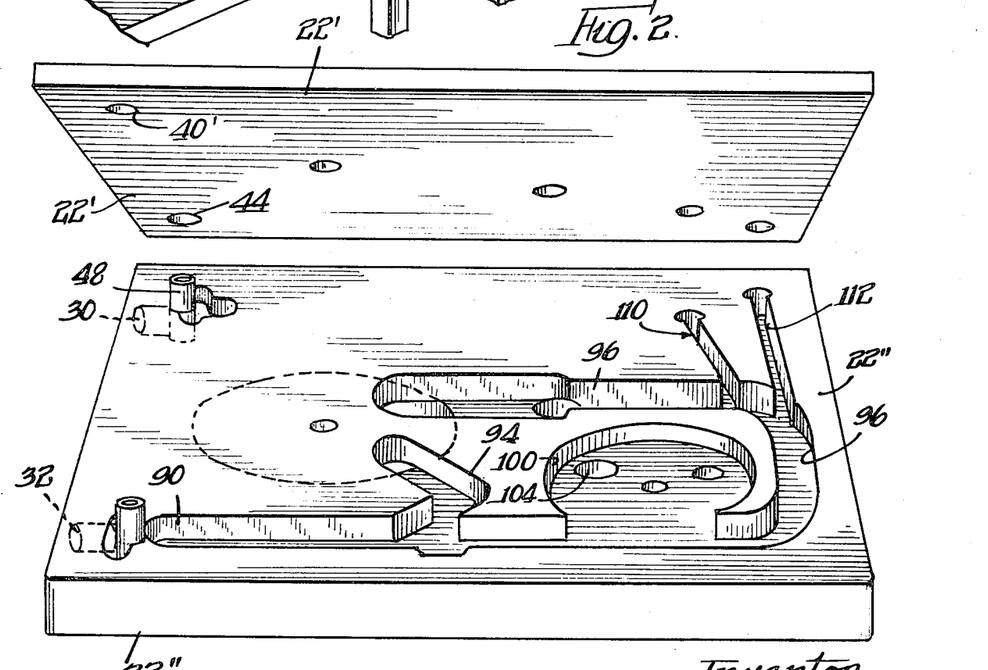
FIG. 2 is a perspective view of the body member of the apparatus of the present invention with the upper plate portion removed, and illustrating the construction of the lower plate portion.

FIG. 2 illustrates the manner in which the internal passages of the body member 22 for the present invention are defined. The exact function of these various passages and their cooperation regarding the overall operation of the apparatus will be detailed subsequently. However, it should be noted at this time that the member 22 is comprised of interconnected upper and lower platelike sections 22' and 22''', shown in disassembled relation in FIG. 2. The lower section 22'' has a plurality of channels or relieved portions formed therein. Accordingly, upon assembly of the upper section 22' thereto, these various channels are covered to define a plurality of interconnected interior passages.

Turning now to FIGS. 3–7, the specific construction of the disclosed embodiment of body member 22 and its function relative to the purging means and the vaporizing means will be considered in detail.

Figure 3:
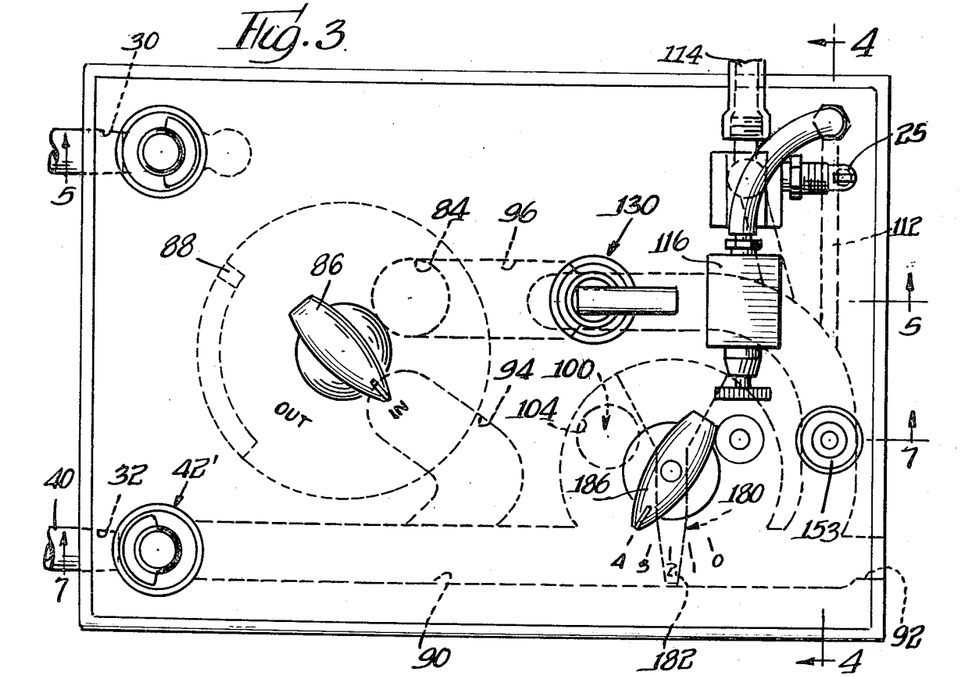
FIG. 3 is a top plan view of the body member of the present invention with the various internal passages or the like illustrated in dotted outline.

As can be seen from FIG. 3, the body member 22 is of a substantially flat, rectangular construction. Inlet port 30 is in the upper left-hand portion of the figure, as viewed, and is connected to the exhalation branch 38 of the tube assembly 24 to receive the waste gases exhaled by the animal being anesthetized.

Associated with the inlet port 30 is the one-way inlet valve arrangement 42 mentioned previously which permits the waste gas to enter the body 22, but precludes the withdrawal of gas therefrom when the animal inhales. Inlet port 30 opens into a transverse passage or bore 44 formed in the body 22, and closed by a cap arrangement 46. Disposed coaxially in the passage 44 is a tubular restricter or deflector member 48 which has a portion of its lower wall removed to provide an opening 50 which communicates with the inlet port 30. Also it should be noted that the bottom wall of bore 44 closes the lower end of said restricter 48.

A disc-like valve element 52 is positioned proximate the upper end or edge of restricter 48 and is adapted to rest thereupon in blocking engagement with respect to said open upper end. The disc valve 52 includes a stem 54 which is received in a guide socket 56 formed integral with the cap arrangement 46. The length of stem 54 is less than the depth of socket 56 such that the disc 52 is free to reciprocate relative to the open upper end of the restricter 48, alternately to block or permit communication through the restricter 48.

Figures 5, 6, 8:
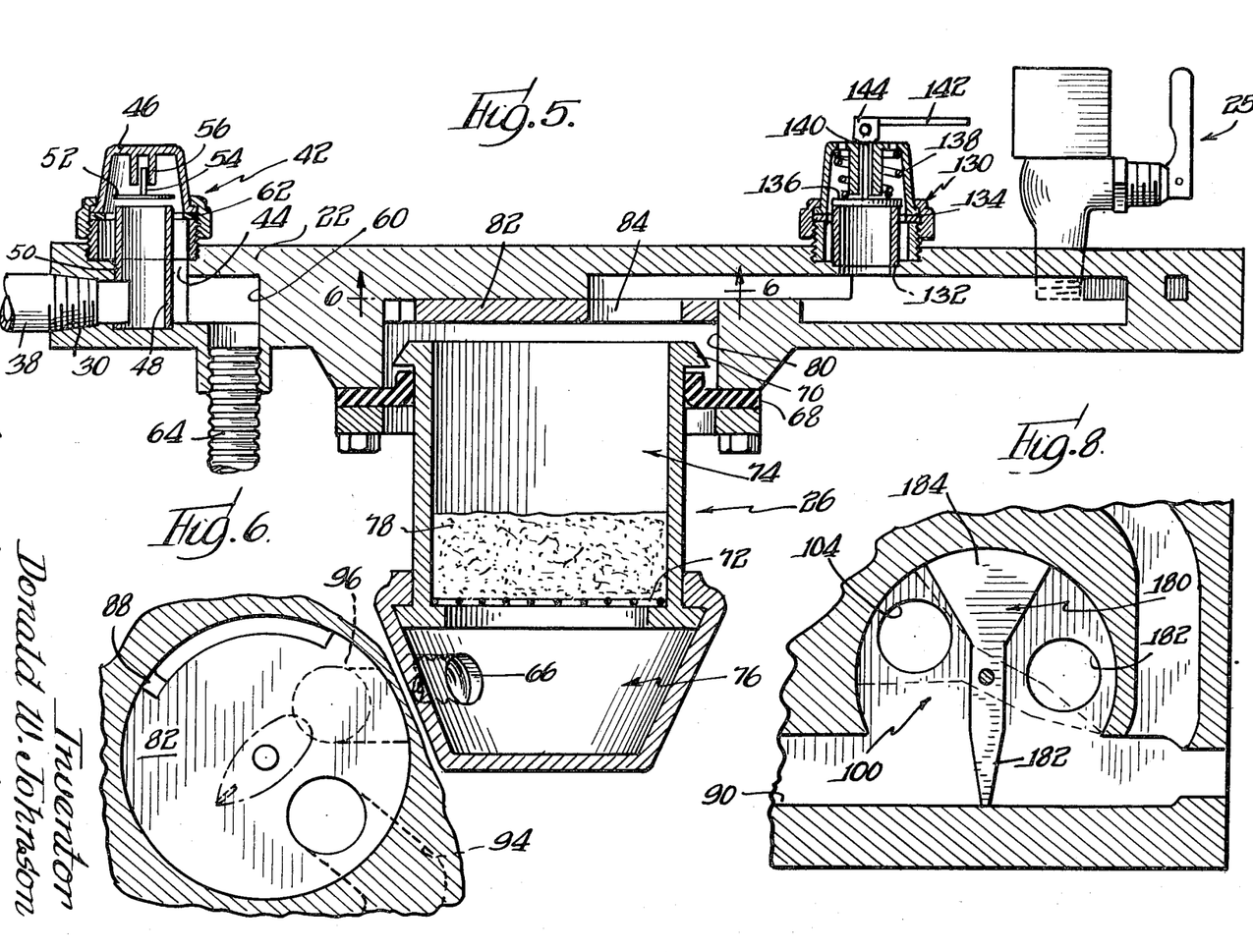
FIG. 5 is a sectional view taken along the line 5—5 of FIG. 3 in the direction indicated.
FIG. 6 is a partial sectional view taken along the line 6—6 of FIG. 5 in the direction indicated and illustrating the alternative position of the control means for the purging agent container.
FIG. 8 is a partial sectional view taken along the line 8—8 of FIG. 7 in the direction indicated, and illustrating the vane member employed in controlling the vaporizer arrangement.

Further, as is illustrated in FIG. 5, there is provided a L-shaped passage 60, one end of which communicates with the transverse bore 44, the other opening to the bottom surface of body member 22. Also, it should be noted that the outer diameter of the restricter 48 is less than the diameter of the bore 44, such that with said restricter is eccentrically positioned in said bore as illustrated, communication between the interior thereof and the L-shaped passage 60 can be established when the disc valve 52 is in the raised position. In order to properly position restricter 48 as discussed, there is provided an aperture positioning washer 62 that is carried by the cap assembly 46 and receives restricter 48 in surrounding engagement.

Accordingly, as waste gas enters the body member 22 via port 30 it will be deflected upward by the restricter 48 to unseat the disc valve 52. Once the disc valve 52 is unseated, the gases will flow over the upper edge of restricter 48 and downwardly between said restricter and the bore 44 into the L-shaped passage 60. However, when the animal inhales, any tendency to draw gases in a reverse direction, viz., out of the L-shaped passage 60, will be precluded by the seating of the disc valve 52 on the upper open end of restricter 48. Thus, it can be seen that the valve assembly 42 only permits gas to enter the body member 22, and positively precludes any withdrawal therefrom.

Coupled to the L-shaped passage 60 is a section of flexible hose 64 which communicates with the inlet opening 66 in the purging agent container 26, as seen in FIG. 5. Accordingly, after the gases enter the body member 22 through the one-way valve arrangement 42 it then will pass through the section of tubing 64 and into the purging agent container 26.

The purging agent container 26 is of a generally tubular configuration and is carried by the lower portion of the body member 22. The means for mounting said container 26 to the body member 22 may be of any known form, the illustrated arrangement employing a mounting disc bolted to the body member 22 and engaging an annular flange 70 formed on the upper open end of the container 26.

A permeable screen element 72 is carried by container 26 which in effect divides the container into an upper compartment 74 and a lower compartment 76. Disposed in the upper compartment 74 is a quantity of purging agent 78, such as soda lime or the like. The lower compartment 76 has the inlet opening 66 formed therein, such that waste gas will enter said compartment 76 and will pass upwardly through the screen 72 and the purging agent 78. The purging agent 78 absorbs the carbon dioxide from the waste gases, such that the gas leaving container 26 is substantially fit for rebreathing, except for its low oxygen content occasioned by the absorption thereof by the animal.

In the illustrated form of the invention, the upper open end of the container 26 is received within a bore 80 defined by the body member 22. Said bore being sealed from the surrounding environment by means of the mounting arrangement employed for the container 26 such that escape of the purged gas to the atmosphere is precluded. A rotatable plate member 82 is carried by the body member 22 in juxtaposition to the bottom wall of the bore 80, and in superposed relation to the upper open end of container 26. The plate member 82 has an aperture 84 formed therein, which aperture provides the means of communication between the purging agent container 26 and the remainder of the internal closed system. In this regard, it should be noted that by rotation of the plate member 82, the disposition of aperture 84 relative to the internal passages formed in member 20 may be controlled, such that the purged gas emitted from container 26 may be directed to a desired one of said passages.

Directing attention to FIGS. 3 and 5, a control knob 86 may be associated with said plate 82 to facilitate movement thereof. Also, if desired, a portion of the periphery of the plate 82 can be removed to accommodate a stop member 88 integrally formed on the body member 22. Accordingly, the interaction between said stop member 88 and plate 82 defines the limits of movement of said plate, which limits are selected to assure alignment of aperture 84 with a desired internal passage.

Figures 7, 9, 10, 11:
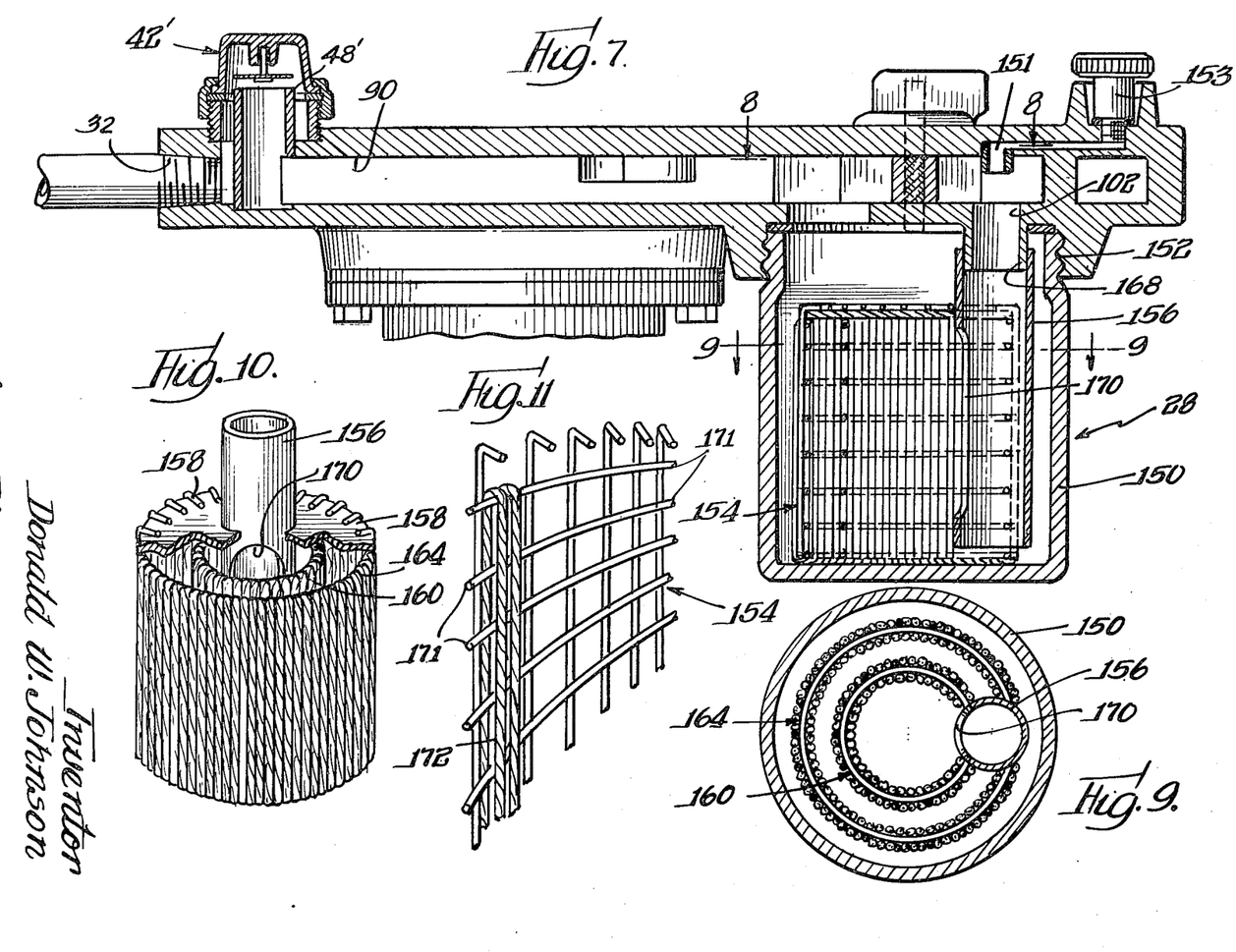
FIG. 7 is a sectional view taken along the line 7—7 of FIG. 3 in the direction indicated.
FIG. 9 is a sectional view taken along the line 9—9 of FIG. 7.
FIGS. 10 and 11 are perspective views illustrating the construction of the wick element employed with the vaporizer apparatus of FIG. 7.

Directing attention now to FIGS. 2 and 3, adjacent outlet port 32 there is provided a one-way valve assembly which is substantially identical to the aforediscussed assembly 42, and accordingly is designated 42'. The assembly 42' provides communication between the outlet port 32 and the interior passages of the body member 22. In this regard, the position of the restricter member 48' is reversed with respect to the corresponding element of arrangement 42, as can be seen in FIG. 7. Thus, gas can only be drawn out of the outlet port 32 upon inhaling by the animal, and entry of exhaust gas via port 32 is positively precluded by the one-way valve arrangement 42'. Further, since the arrangement 42' is substantially identical to the previously discussed valve construction 42, the elements thereof have been designated by like reference number, primed (') and a detailed discussion of the structural feature is deemed unnecessary.

Considering now the specific construction of the internal passages of body member 22, associated with the one-way valve assembly 42' is an elongated outlet passage 90, which extends for substantially the entire length of the body member 22 opening at one end thereof to provide a port 92 for the reservoir bag 23. In communication with the elongate outlet 90 are a pair of separate and distinct passages 94 and 96. Both the passages 94 and 96 communicate with the purging agent container receiving bore 80. Thus, it can be seen that communication between the interior of said container 26 and either of the respective passages 94 and 96 can be established, depending upon the relative disposition or positioning of the control plate 82. That is to say, when plate 82 is in the position illustrated in FIG. 3, aperture 84 is aligned with the end of passage 96 to establish communication between said passage and the interior of the container. On the other hand, in the position illustrated in FIG. 6, plate 82 blocks communication between said container 26 and the passage 94 while the aperture 84 is aligned with passage 94 to establish communication therebetween.

It will be recalled, that the present apparatus 20 is designed to operate as an "in-line" or an "out-of-line" system, with respect to the relative disposition of the vaporizer assembly 28. Accordingly, still with reference to FIGS. 2 and 3, the body member 22 further includes a vaporizer control chamber 100 disposed intermediate the points wherein passages 94 and 96 merge or connect with the elongate outlet passage 90. In the floor of the chamber 100 there are provided a pair of ports or openings 102 and 104 which serve as the inlet and outlet, respectively, for the vaporizer unit 28. The general overall construction of the vaporizer apparatus of the present invention will be discussed in detail hereinafter. However, it can be seen that with the vaporizing inlet and outlet ports disposed intermediate the respective passages 94 and 96, and considering the closed circuit path that the gas must take, it can be seen that only when the purged waste gas is channeled through the passage 96 can it thus be subjected to the vaporizer apparatus 28. When the elements of apparatus 28 are so disposed, it functions as an "in-line" arrangement. On the other hand, when the purged waste gas from the container 26 is directed to the passageway 94, the vaporizer control chamber 100 is effectively bypassed such that the purged gas can pass directly to passageway 90 and out through port 32. Accordingly, for purposes of identification hereinafter the passageway 96 is termed the "in-line" passageway, while passageway 94 is designated the "out-of-line" passageway.

Before considering the construction of the vaporizer apparatus 28 and its manner of control and its relation to the anesthetizing process, it is deemed advisable to first consider the oxygen inlet means 25 referred to previously. Recalling the prior discussion of the anesthetizing process with a closed circuit system of the type under discussion, it is necessary to continuously add oxygen to the gaseous mixture that is to be recirculated to the animal. With an "in-line" arrangement, the oxygen is first mixed with the purged waste gases and the resulting combination, or selected portions thereof are subjected to the vaporizing process. With an "out-of-line" arrangement, only the oxygen being introduced to the system is passed through the vaporizer unit 28, and the resulting mixture of oxygen and anesthetic gas is then mixed with the purged waste gases.

Figure 4:
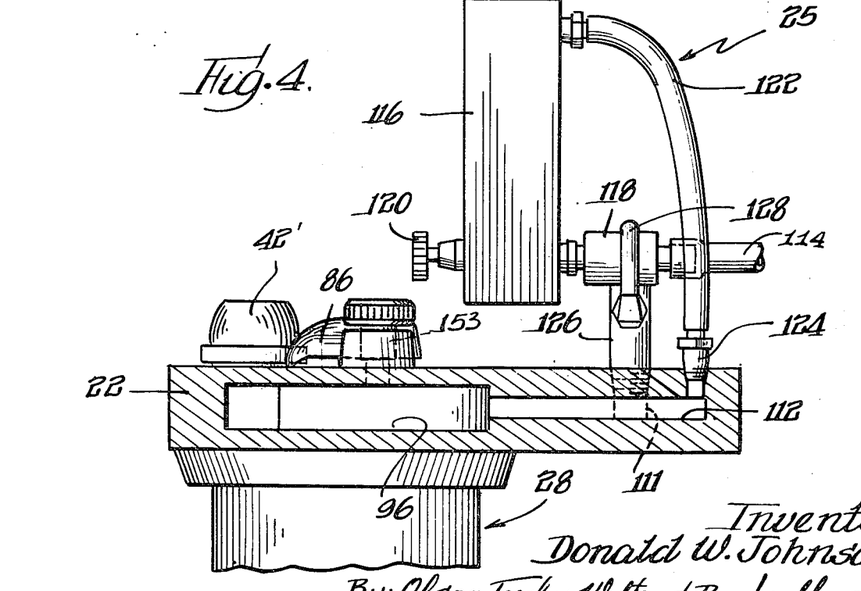
FIG. 4 is a sectional view taken along the line 4—4 of FIG. 3 in the direction indicated.

Accordingly, in conjunction with the oxygen introducing means 25, attention is now directed to FIGS. 2, 4 and 5. Considering first FIG. 2, it can been seen that there is provided a pair of passages 110 and 112, both of which communicate only with the in-line passage 96. Therefor, since it is these passages that are utilized in the introduction of oxygen into the system, oxygen can only reach the downstream portion of passage 96 by passing through chamber 100.

Considering now FIG. 4, the oxygen inlet means 25 include an inlet line 114 which communicates with a flow-meter 116 through a bypass valve 118. Under normal conditions, the valve 118 is positioned to direct oxygen from line 114 into the flow-meter 116. The flow-meter 116 includes a control dial 120 which is employed to adjust the rate of flow of oxygen from the meter to the system. The oxygen inlet passage 112 is connected to the outlet of the flow-meter 116 by means of a section of conduit 122, and a fitting 124 in order to introduce oxygen into passage 112.

Under emergency conditions, however, where the anesthetized animal is receiving less than the required amount of oxygen, it is necessary to bypass the flow-meter 116 in order to flood the system with as much oxygen as possible. To attain this result, the valve 118 is provided with an alternate outlet port 126 which in turn is connected directly to the oxygen inlet passage 110, rather than the flow-meter 116. The direction of flow through the bypass valve 118 is controlled by a toggle lever 128, such that under emergency conditions the operator can flip said lever 128 to bypass the flow-meter and feed substantial quantities of oxygen into port 126 and the associated passage 110.

Since the present invention employs a closed system, and oxygen is continuously being introduced into the system, a degree of pressure build-up will occur. To accommodate this build-up, the apparatus 20 includes a relief valve assembly 130 illustrated in FIG. 5.

The relief valve assembly 130 communicates with the in-line passage 96 through a port 132 formed in the body member 22. Associated with said port 132 is a tubular element 134 which has its upper end closed by a valve member 136. Valve member 136 is biased into closed sealing engagement with the element 134 by means of a spring 138. Thus, when the operating pressure of the passage 96 exceeds a predetermined level established by the biasing force of spring 138, the valve member 136 will be moved outwardly to allow gas to escape, so that the internal gas pressure may be maintained at a point within a desired range.

It will be recalled, however, that under certain conditions it is necessary that respiration of the animal be induced by use of a reservoir bag 23. Accordingly, since the success of this process requires a build-up of gaseous pressure to expand the animal's lungs, it is necessary to disable the relief valve assembly 130. To provide for this, the valve element 136 includes a stem 140 which extends upwardly and is connected to a toggle lever 142 that has a cam-like end portion 144. Thus, in the illustrated position of the toggle lever 142, the relief valve 130 is in the operating condition, however, should lever 142 be raised, the valve element 136 will be locked in position, so that a build-up in the operating pressure in the system can be achieved.

Turning now to FIG. 7, this figure is a sectional view taken through the apparatus proximate the outlet passage 90, and illustrates in detail the construction of the one-way valve arrangement 42' as well as the vaporizer apparatus 28, the latter of which is to be discussed in detail hereinafter.

The vaporizer apparatus 28 includes a container 150 for the anesthetic agent which is carried by the body member 22 by means of the disposition of the upper open end thereof in a socket 152 defined by said body. While a threaded connection is shown, various means may be employed to effect this connection. The aforementioned vaporizer control chamber 100 is aligned with the socket 152 such that a common wall portion defines the bottom of socket 152, as well as the lower wall of the chamber 100.

Inviting attention now to the upper right-hand portion of FIG. 7, as viewed, there is illustrated filler means which permit the filling of the container 150 with the anesthetic agent without disconnecting said container from the body member 22. The filler means includes a passage 151 formed in the upper half of the body member 22. The passage 151 has one end opening to the top surface of the body member and another end aligned with the inlet port 102 of the vaporizer unit 28. The removable plug member 153 is provided in blocking relation to the end of passage 151 opening to the upper surface of body member 22. Accordingly, when it is desired to fill the container 150 with the anesthetic agent, the plug 153 is removed and the anesthetic agent poured into the open end of passage 151 whereby it will be dispensed downwardly through the inlet passage 102 into the container 150.

Disposed within the container 150 is a wick assembly 154 which facilitates vaporization of the anesthetic agent. The wick assembly, which is illustrated in perspective in FIG. 10, includes a main tube 156, a wick support member 158 and inner and outer wick elements 160 and 164. The main or entry tube 156 has its upper end coupled to a tubular extension 168 on body member 22 which defines the vaporizer inlet port 102, thus establishing communication between the chamber 100 and said entry tube 156. The lower portion of entry tube 156 has port 170 formed therein at a location below the wick support member 158. Thus, gas exiting from the tube 156 will pass through both the inner wick element 160 and the outer wick element 164 before exiting from the outlet port 104.

Considering now FIG. 11, the general construction of the wick elements 160 and 164 can be viewed. In this regard, each element is comprised of a meshlike wire frame 171 which has fibrous strands of wicking 172 wrapped therearound, as illustrated.

In order to control the vaporizing operation, a vane element 180 is disposed within the chamber 100, as illustrated. It will be recalled that during the anesthetizing procedure it is often desirable to divert all of the gas to the vaporizer unit 28; however, under certain circumstances it is desirable to bypass the vaporizer altogether, or merely direct a portion of the gaseous product from passageway 96 into unit 28.

The vane 180, as will be noted, is narrow at one end 182, while the opposite end 184 is of a substantially broad triangular configuration. The vane is rotatably mounted within the chamber 100 and operably connected to an actuator knob 186, such that its position relative to said chamber 100 and the inlet and outlet openings 102 and 104 of the vaporizer unit can be adjusted. The thickness and configuration of the vane 180 is such that when the position illustrated in FIG. 3, direct communication between the downstream portion of passage 90 and the passageway 96 is blocked by said vane, the only path of communication being through the vaporizer apparatus 28. However, referring now to FIG. 8, when the control vane 180 is moved to the position illustrated in dotted outline, the respective end portions 184 and 182 block communication between the vaporizer and the control chamber 100, thus permitting any gaseous product in the passageway 96 to flow directly through chamber 100 into the downstream portion of passage 90, thus bypassing the vaporizer 28 on its way to the outlet port 32. Further, it should be noted that by adjusting the position of vane 180 between the two positions illustrated in FIG. 8, the amount of gaseous product allowed to bypass the vaporizer 28 can be controlled. That is, considering the full line illustration of said vane 180, as it is moved in a clockwise direction, the narrow end 182 will be displaced from the vertical wall of outlet passage 90 so that a portion of the gas entering the control chamber 100 will be permitted to bypass the vaporizer while the remainder is diverted to the inlet opening 102. Obviously, as the degree of clockwise rotation increases so does the amount of gas permitted to bypass the vaporizing apparatus 28. It also should be noted that the clockwise rotation of the vane 180 under discussion also causes the broad triangular shaped portion 184 to cover progressively the vaporizer inlet port 102, same being completely blocked upon the engagement of the narrow end 182 with the arcuate sidewall of the control chamber 100.

Thus, it can be seen that by proper employment of the vane 180, the amount of anesthetic agents being introduced into the system in either the "in-line" or "out-of-line" condition can be controlled. On the other hand, once the animal has reached a desired state of anesthetization, the vane can be moved to the blocking position illustrated in full line in FIG. 8, such that the vaporizer apparatus is bypassed completely, the unabsorbed anesthetic agent in the waste gas serving to maintain this state of anesthetization for a period of time.

For purposes of affording a more complete understanding of the invention, it is believed advantageous at this time to now describe in sequence the operation of the forediscussed anesthesia apparatus 20. The operation thereof will first be described with regard to the "in-line" condition, that is illustrated in the drawings.

Subsequent to the preparation of the animal for anesthetization with a tranquilizing agent the endotracheal portion 36 of the tubing 24 is disposed in the trachea of the animal, and the inhalation and exhalation branches 38 and 40 are connected to the inlet and outlet ports 30 and 32 of the apparatus 20, as shown in FIG. 1. At this point, the control vane 180 is in the blocking position such that the vaporizer unit 28 is out of circuit with the internal passages of body member 22. Also, in conjunction with the disposition of the endotracheal tube, the oxygen supply is turned on such that the flow-meter 116 is introducing a continuous, regulated supply of oxygen into the passageway 96 via the passage 112. As the animal breathes in its tranquilized state, the exhaled waste gases will enter the inlet port 30 and will be passed through the purging agent 78 carried in container 26 to remove carbon dioxide therefrom. After removal of the carbon dioxide, the purged waste gases pass into the in-line passage 96 through the opening 84 in the control plate 82. As the purged waste gas travels the length of passage 96 it is mixed with the newly introduced oxygen being introduced into passage 96 by means of the passageway 112. From there, the gaseous mixture enters the upstream end of the outlet passage 90, and from there the control chamber 100, bypassing the vaporizer due to the position of the vane 180. Upon leaving the control chamber 100, the mixture then travels the length of the outlet passage 90 and passes out of body member 22 through port 32 into the inhalation branch 40.

After all the initial connections have been established, the pressure relief valve 130 is closed and the reservoir bag 23 is squeezed firmly to increase the pressure in the system and thereby permit detection of any leaks, or the like. Once the operator is satisfied that the system is substantially leak-free, the pressure relief valve 130 is opened. This feature in conjunction with periodic emptying of the reservoir bag insures proper denitrogenation of the system and prevents hypoxia.

Accordingly, with the animal tranquilized and the operator satisfied that the system if functioning properly, he then connects the vaporizer apparatus 28 into the system by use of the control dial 186 which effects the aforediscussed counter-clockwise rotation of vane 180. Thus, the mixture of purged waste gas and oxygen entering the upstream portion of passage 90 from the in-line passage 96 will be diverted by the vane portion 182 into chamber 100 and from there through the inlet port 102. Looking now to FIG. 7, the gaseous mixture will then be directed downwardly into the entry tube 156 of the work assembly, and then from there out through the aperture 170 and through the work elements. By this operation, the anesthetic agent is vaporized and combined with the gaseous mixture which leaves the vaporizer unit 28 through the outlet port 104, and then passes into the outlet passage 90. The resulting combination including the anesthetic agent then passes out of the body member 22 to the animal.

Considering now the out-of-line condition, the steps for preparing the animal for anesthetization are identical to those described above. As to the apparatus 20, the indicator knob 86 is turned approximately 90° in a clockwise direction, such that the aperture 84 of plate 82 is aligned with the passage 94, as illustrated in FIG. 6. Similar to the in-line condition, the control vane 180 is positioned to block communication with the vaporizer apparatus 28, as shown in dotted outline in FIG. 8. The oxygen supply is connected and flow-meter 116 set so that oxygen flows into the apparatus by means of the passage 112. In this regard, it should be noted that while the apparatus is in the out-of-line condition, oxygen can still be channeled to the outlet passage 90 through the downstream portion of the passage 96 and chamber 100.

With the apparatus in the aforedescribed condition, after the exhaled waste gases are purged of carbon dioxide, they are then introduced into the passages 94 and 90. These gases, except for their extremely low oxygen content are fit for recirculation to the animal. The oxygen deficiency is overcome by the supply means 25, which continuously adds a metered quantity of oxygen into the internal passage system of the apparatus 20, which is mixed with the purged waste gases being introduced into passage 90.

When it is desired to anesthetize the animal, the control knob 186 is indexed to the position illustrated in full line in FIG. 8, thus placing the vaporizer apparatus 28 in circuit with the path the oxygen must take in order to reach the outlet junction of passages 90 and 94. Since the oxygen cannot bypass the vane 180, it will enter the vaporizer through the inlet port 102 where it is subjected to the vaporizing process such that the resulting gaseous mixture leaving the vaporizer 28 contains a substantial quantity of anesthetic gas. This combination of oxygen and the anesthetic gas is mixed with the purged waste gases at the point of juncture of passages 90 and 94. Once the animal has reached the desired state of anesthetization, the vane 180 is adjusted to the proper position to maintain said condition.

The invention is claimed as follows:

1. Apparatus for administering anesthesia to animals or the like, said apparatus comprising: a main body member having an inlet port and an outlet port, an internal passage means for providing a closed system for anesthetic gas; a canister connected to said body member, said canister adapted to contain a purging agent of the type used for removing carbon dioxide from the gas exhaled by said animal, said canister having an inlet in communication with said body inlet port, and an outlet opening for communication with said internal passage means such that exhaled gases will be passed through said purging agent canister and into said internal passage means; a vaporizer assembly connected to said body member, said vaporizer assembly having inlet and outlet openings; said internal passage means providing two paths from said canister outlet to the outlet port of said body member, one said path communicating directly with said outlet port, and the other said path communicating with said vaporizing assembly; inlet means for oxygen connected to said other path intermediate said canister outlet and said vaporizer assembly; and control means for said apparatus, including means for selectively connecting said canister outlet to one or the other of said paths, such that said apparatus may be used as either an in-line system or an out-of-line system for adminstering anesthetic gas, and means for selectively blocking said vaporizer assembly inlet and outlet openings so that the amount of gas introduced into said vaporzier assembly may be regulated, and said assembly bypassed if desired.

2. Apparatus as defined in claim 1 wherein said means for selectively blocking the vaporizer inlet and outlet openings includes a movable member carried by said body and adapted to have its position varied such that said vaporizer assembly is bypassed by the gas from the purging agent canister, or all or a desired portion of said gas will be channeled to said vaporizer assembly.

3. Apparatus as defined in claim 1 wherein said inlet means for the oxygen includes a flow meter for admitting a prescribed amount of oxygen into said closed circuit.

4. Apparatus as defined in claim 3 where said inlet means for the oxygen further includes a valve assembly permitting the flow meter to be bypassed whereby oxygen can be introduced directly into said closed circuit.

5. Apparatus as defined in claim 1 wherein said body member further includes a reservoir bag port communicating with said other path, and a reservoir bag attached to said port enabling the person administering the anesthestic to induce breathing in the anesthetized animal.

6. Apparatus as defined in claim 5 wherein said internal passages further include a pressure relief valve, said valve including means to lock it in a closed position such that it cannot be opened upon the inducement of breathing by use of said reservoir bag.

7. Apparatus as defined in claim 1 wherein said control means for selectively connecting the canister outlet to one or the other of said paths includes a plate-like member having an aperture therein and disposed atop said canister such that said aperture provides communication thereto, said plate being selectively movable between a first position wherein said opening operably connects the canister with one of said paths, and a second position wherein said aperture operably connects said canister with the other of said paths.

8. Apparatus as defined in claim 1, further including flexible tube means which comprise as an endotrachea member received by the animal, an inhalation branch connected to said outlet port, and an exhalation branch connected to said inlet port.

9. Apparatus as defined in claim 1 wherein a one-way valve assembly provides for communication between each said inlet port and said outlet port and the internal passage means.

10. Apparatus as defined in claim 9 wherein at least one of said valve assemblies includes, a restricter member disposed in the passageway communicating with said port, said restricter member having a tubular wall section disposed transversely of said passageway with an opening in the lower portion thereof so that gas may freely enter the lower end of said restricter member and be channeled upwardly toward the upper end thereof, a reciprocal disc valve member engaged over the upper end of said tubular restricter member enclosing said end, said disc being disengageable from said upper end by gas travelling through said restricter member, while precluding gas from entering the restricter member from the upper end thereof, and passage means providing communication from the upper end of said restricter member to said body port.

11. Apparatus for administering anesthesia to animals, or the like, said apparatus comprising: a main body assembly having an inhalation port and an exhalation port, internal passage means providing a closed system for movement of gas from said inhalation port to said exhalation port; a canister connected to said main body assembly and adapted to contain a purging agent of the type used for removing carbon dioxide from the exhaled waste gases of said animal, said canister having an inlet and an outlet in communication with said internal passage means, such that exhaled gases entering the body assembly pass through said purging agent prior to reaching said inhalation port; a vaporizer unit connected to said body assembly for introducing an anesthetic gas into said internal passage means of the system; the improvement wherein said body assembly comprises upper and lower plate sections, the surface of said lower section confronting the upper section having a plurality of channels formed therein such that upon assembly of said upper section thereto, said channels are covered to define said internal passage means.

12. Apparatus as defined in claim 11, wherein said lower section includes a pair of apertures serving as inlet and outlet openings for the vaporizer unit, and there is further provided control means for selectively blocking said inlet and outlet openings connecting the vaporizer unit to the system, whereby purged waste gases may pass through said body assembly without having an anesthetic gas added thereto.

13. Apparatus as defined in claim 12 wherein said lower plate section further includes a relieved portion formed in said confronting surface such that upon assembly a chamber is provided which intersects said internal passage means, and means on the opposite surface of said lower plate section for connecting said vaporizer unit thereto, said inlet and outlet openings being formed in said lower plate section thus providing for communication between said vaporizer unit and said chamber, and said control means being disposed in said chamber for selectively blocking said inlet and outlet openings.

14. Apparatus as defined in claim 13 wherein said chamber is substantially circular in configuration, and said control means include a vane rotatably mounted within said chamber, said vane having a length proximating the diameter of said chamber.

15. Apparatus as defined in claim 11 wherein said passage means include two separate paths from the canister outlet to the inhalation port, one said path communicating directly with said inhalation port and the other path being operatively associated with the vaporizer unit to provide for the connection of said unit to the system, and means carried by said body assembly for selectively connecting one or the other of said paths with said canister outlet.

16. Apparatus as defined in claim 15, further including oxygen inlet means connected to said other path intermediate the point of connection to said canister outlet and said inlet opening for the vaporizer unit.

* * * * *

UNITED STATES PATENT OFFICE
CERTIFICATE OF CORRECTION

Patent No. 3,687,137             Dated August 29, 1972

Inventor(s) Donald W. Johnson

It is certified that error appears in the above-identified patent and that said Letters Patent are hereby corrected as shown below:

Col. 3, line 53, change "breathing" to --rebreathing--

Col. 4, line 8, change 22"' to --22''--

Col. 9, line 24, after "when" insert --in--

Col. 11, line 63, change "vaporizing" to --vaporizer--

Col. 12, line 6, change "vaporzier" to --vaporizer--

Signed and sealed this 10th day of April 1973.

(SEAL)
Attest:

EDWARD M. FLETCHER, JR.                ROBERT GOTTSCHALK
Attesting Officer                      Commissioner of Patents